(12) United States Patent
Grotendorst et al.

(10) Patent No.: US 6,941,989 B2
(45) Date of Patent: Sep. 13, 2005

(54) TIRE PRESSURE CONTROL ARRANGEMENT FOR A MOTOR VEHICLE

(75) Inventors: Jörg Grotendorst, Garbsen (DE); Ludwig Dreilich, Neustadt (DE)

(73) Assignee: Continental Aktiengesellschaft, Hannover (DE)

( * ) Notice: Subject to any disclaimer, the term of this patent is extended or adjusted under 35 U.S.C. 154(b) by 102 days.

(21) Appl. No.: 10/462,705

(22) Filed: Jun. 17, 2003

(65) Prior Publication Data

US 2003/0234066 A1 Dec. 25, 2003

(30) Foreign Application Priority Data

Jun. 20, 2002 (DE) .......................... 102 27 642

(51) Int. Cl.⁷ .............................................. B60C 23/10
(52) U.S. Cl. ...................... 152/415; 152/416; 340/442; 340/449; 73/146
(58) Field of Search ................................ 152/416, 415, 152/417, 418, 419, 426, 427, 429; 73/760, 146, 416.2; 340/442, 438, 443, 444, 446, 447, 449, 665, 666; 702/138, 140

(56) References Cited

U.S. PATENT DOCUMENTS

| | | | | |
|---|---|---|---|---|
| 4,763,709 A | * | 8/1988 | Scholer | ................. 152/416 |
| 5,540,268 A | | 7/1996 | Mittal | |
| 5,965,808 A | * | 10/1999 | Normann et al. | .......... 73/146.5 |
| 6,044,313 A | * | 3/2000 | Gannon | ....................... 701/29 |
| 6,144,295 A | * | 11/2000 | Adams et al. | ............... 340/442 |
| 6,218,935 B1 | * | 4/2001 | Corcoran et al. | ........... 340/444 |
| 6,446,023 B1 | * | 9/2002 | Ernst | ......................... 702/138 |
| 6,498,967 B1 | * | 12/2002 | Hopkins et al. | ................ 701/1 |
| 6,556,915 B2 | * | 4/2003 | McCurdy | ...................... 701/97 |
| 6,615,888 B2 | * | 9/2003 | Elkow | ...................... 152/342.1 |
| 6,671,609 B2 | * | 12/2003 | Nantz et al. | ................... 701/93 |
| 2003/0051554 A1 | | 3/2003 | Stiller | |

FOREIGN PATENT DOCUMENTS

| | | | |
|---|---|---|---|
| DE | 36 19 603 | 1/1987 | |
| DE | 37 20 787 | 2/1988 | |
| DE | 197 23 037 | 12/1997 | |
| DE | 19723037 A1 | * 12/1997 | ........... B60C/23/00 |
| EP | 1 044 828 | 10/2000 | |
| JP | 63061613 A | * 3/1988 | ........... B60C/23/00 |
| WO | WO 34063 A1 | * 6/2000 | ........... B60C/23/04 |

* cited by examiner

Primary Examiner—Frantz F. Jules
(74) Attorney, Agent, or Firm—Walter Ottesen

(57) ABSTRACT

A tire pressure control arrangement for a motor vehicle monitors the air pressure of at least one pneumatic tire and a signal is outputted from the arrangement when, in at least one tire of the motor vehicle, the air pressure drops below a lower threshold value or exceeds an upper threshold value. The lower and/or upper threshold value(s) are set in dependence upon the laden state of the motor vehicle. The laden state is determined with the aid of an air suspension system and the setting takes place automatically with the aid of the determined laden state.

9 Claims, 1 Drawing Sheet

TIRE PRESSURE CONTROL ARRANGEMENT FOR A MOTOR VEHICLE

FIELD OF THE INVENTION

The invention relates to a tire pressure control arrangement for a motor vehicle with which the air pressure of at least one pneumatic tire of the motor vehicle is monitored and which outputs a signal when the air pressure in at least one tire drops below a lower threshold value or exceeds an upper threshold value.

BACKGROUND OF THE INVENTION

The correct tire pressure in the pneumatic tires of a motor vehicle is of great significance in several aspects. Accordingly, an air pressure in the tires which is too low, for example, leads to an increased rolling resistance and to an increase in the consumption of fuel by the motor vehicle and, furthermore, to an increased wear of the tires. In the worst case, when the air pressure in a tire of the motor vehicle has dropped so greatly, this can even lead to the situation wherein the tire becomes greatly overheated because of the increased rolling resistance and blows out. Accidents which are caused by tire blowouts mostly have serious consequences so that they are to be avoided if at all possible. An air pressure in the tires of the motor vehicle which is too great is also viewed as disadvantageous. This leads to the situation that the tires are no longer in contact with the roadway with their entire road contact surface but only with a portion of the roadway contact surface. This has the consequence of increased wear of the tires and a deterioration of the driving safety.

For the reasons advanced above, modern motor vehicles often have a tire pressure control arrangement which monitors the air pressure in the tires and outputs a signal when the air pressure in at least one of the tires of the motor vehicle drops below a lower threshold value or exceeds an upper threshold value. The driver is then afforded the possibility to so control the air pressure that the air pressure again lies between the threshold values. In most tire pressure control arrangements, the threshold values are set independently of the weight of the vehicle or the laden state of the motor vehicle.

There are, however, tire pressure control arrangements wherein the threshold values can be inputted manually so that they can be adapted to the vehicle weight or laden state thereof. This is purposeful in that, for a high vehicle weight (that is, a high laden state of the motor vehicle), the lower and the upper threshold value are increased and, for a low vehicle weight (that is, for a low laden state), these threshold values are lowered in order to consider the laden state. The safety of the motor vehicle can be increased by tire pressure control arrangements wherein a manual input of the threshold values is possible because the laden state of the motor vehicle is considered when there is a warning from the tire pressure control arrangement to the driver. Often, however, the adaptation of the threshold values is overlooked by the driver for various reasons so that the theoretically conceivable gain in safety is defeated.

SUMMARY OF THE INVENTION

It is an object of the invention to provide a tire pressure control arrangement for a motor vehicle which ensures a high safety of the motor vehicle with a view to the monitoring of the air pressure in the tires thereof.

The tire pressure control arrangement of the invention is for a motor vehicle and includes: means for monitoring the air pressure in at least one pneumatic tire of the motor vehicle; means for outputting a signal when the air pressure in the at least one pneumatic tire drops below a lower threshold value or exceeds an upper threshold value; an air suspension system including means for determining the laden state of the motor vehicle; and, means for automatically setting at least one of the threshold values in dependence upon the laden state of the motor vehicle.

Thus, according to a feature of the invention, the lower and/or upper threshold value(s) are set in dependence upon the laden state of the motor vehicle. The laden state is determined with the aid of an air suspension system and the setting of the threshold values takes place automatically with the aid of the determined laden state.

The advantage of the invention is especially that the instantaneous laden state of the motor vehicle is always considered in the setting of the threshold values in the tire pressure control arrangement so that a high monitoring reliability and therefore a high safety of the motor vehicle is guaranteed by the tire pressure control arrangement. A further advantage of the invention is that the setting of the threshold values takes place automatically in the tire pressure control arrangement in dependence upon the laden state which is determined with the air suspension system of the motor vehicle. A manual adaptation to the laden state is not necessary so that the deficiencies with respect to safety explained initially herein cannot occur. A further advantage of the invention is that a substantially exact determination of the laden state is possible with the air suspension system and therefore a precise adaptation of the threshold values is possible. Accordingly, there is not the danger that threshold values, which are too low or too high, are arbitrarily determined which could lead to an unwanted high wear of the tires because of warnings which are too late.

According to another feature of the invention, a renewed setting of the lower and/or upper threshold value(s) takes place with each new use of the motor vehicle. The advantage of this embodiment becomes manifest when one considers that the laden state of the motor vehicle changes significantly in virtually all cases only during standstill of the motor vehicle because of the addition or removal of loads. The advantage of this embodiment is that a renewed setting of the threshold values takes place only when the laden state of the motor vehicle could have changed during standstill. Unnecessary computations of the threshold values during travel of the motor vehicle therefore do not take place.

According to still another feature of the invention, a renewed setting of the lower and/or upper threshold value(s) takes place only when the instantaneous laden state deviates by a pregiven amount from the laden state for which the threshold value had been last set. The advantage of this embodiment is that there is a renewed setting of the threshold values only when the laden state has noticeably changed. Small changes, which can be attributed, for example, to the consumption of fuel by the motor vehicle, do not lead to a renewed setting of the threshold values. The pregiven amount for the deviation of the laden state can be pregiven absolutely or in percent based on an average laden state of the motor vehicle. The threshold values are calibrated in the tire pressure control arrangement of the motor vehicle on the basis of this amount. For example, the pregiven amount can be 5% to 25% of the average laden state. If, for example, a value of 5% is pregiven, then a renewed setting of the threshold value only takes place when the instantaneous laden state deviates by more than 5% from the laden state for which the threshold values had been last set.

According to another feature of the invention, the tire pressure control arrangement and the air suspension system each have a central unit. The laden state is determined in the central unit of the air suspension system and is then transmitted to the central unit of the tire pressure control arrangement wherein the threshold values are set. The advantage of this embodiment is that even motor vehicles which already have a tire pressure control arrangement and an air suspension system can still be adapted to the invention. A further advantage of this embodiment is that the one system is still operational when the central unit of the other system is out of service.

According to another feature of the invention, the tire pressure control arrangement includes means with which the air pressure in at least one tire of the motor vehicle can be controlled. A control takes place when the air pressure drops below the lower threshold value or exceeds the upper threshold value. Here, the control takes place in such a manner that the air pressure in the corresponding tire again lies between the threshold values after the control of the air pressure. The advantage of this embodiment is that an adaptation of the air pressure in the tires takes place automatically and need not be undertaken by the driver. Accordingly, the motor vehicle has, at all times, the maximum possible safety with respect to the air pressure in the tires thereof.

According to still another feature of the invention, the threshold values are set in the tire pressure control arrangement based on an average laden state of the vehicle when, after a specific time span (computed from the last transmission of the instantaneous laden state) no new instantaneous laden states have been received by the tire pressure control arrangement. The advantage of this embodiment is that a setting of the threshold values, which are acceptable for many driving situations of the motor vehicle, takes place based on the average laden state of the vehicle even when no instantaneous laden states are determined by the air suspension system and transmitted to the tire pressure control arrangement (because, for example, the transmission channel between the central unit of the air suspension system and the central unit of the tire pressure control arrangement is disturbed or damaged). As a time span, a time span can be fixed which lies between one and ten days and preferably between five and ten days.

BRIEF DESCRIPTION OF THE DRAWING

The invention will now be described with reference to the single FIGURE of the drawing (FIG.1) which shows a schematic of a motor vehicle having an air suspension system and a tire pressure control arrangement according to an embodiment of the invention.

DESCRIPTION OF THE PREFERRED EMBODIMENTS OF THE INVENTION

Figure 1:
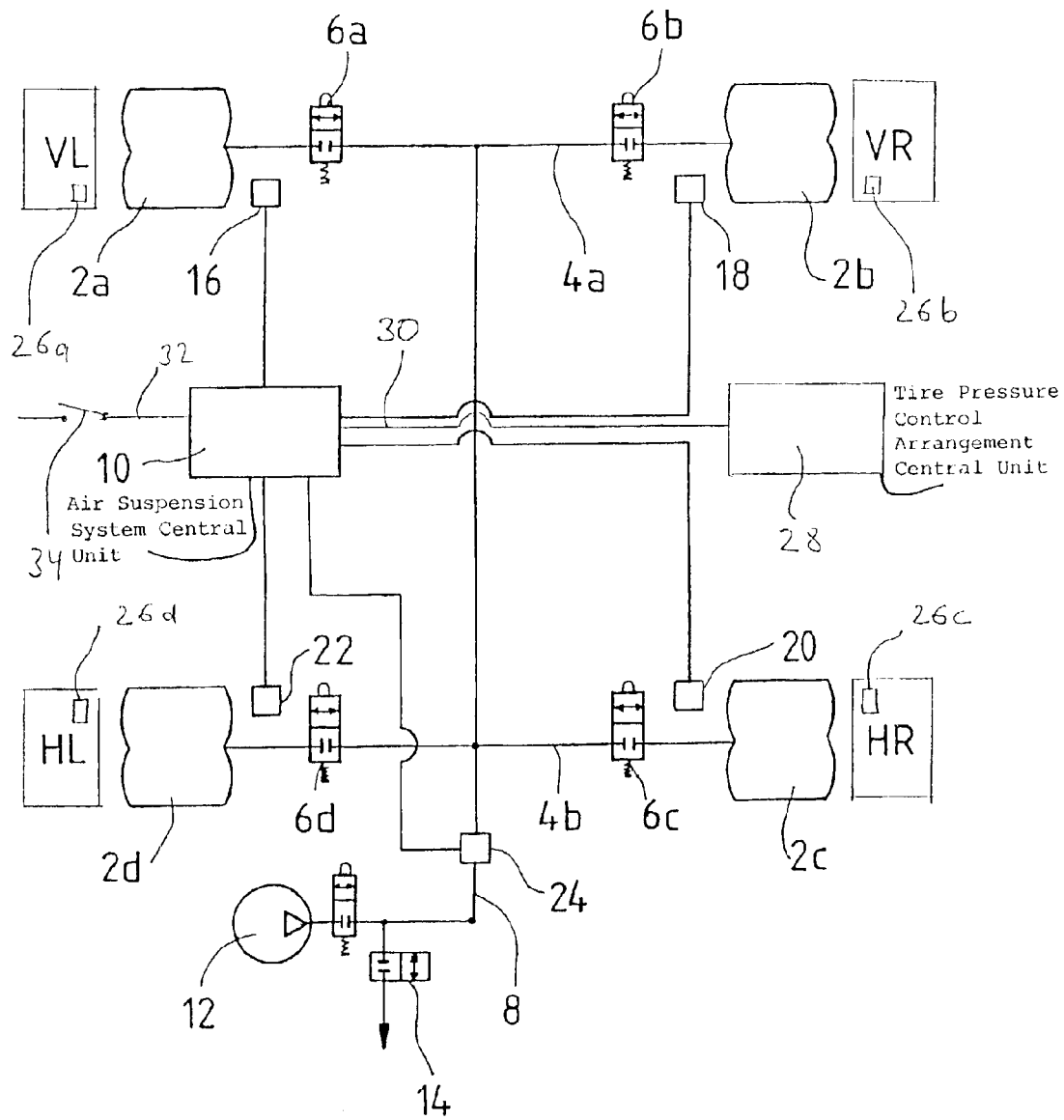

FIG. 1 shows an air suspension system with which the level of the vehicle body (not shown) of the motor vehicle can be controlled relative to the axles of the vehicle. For this purpose, the air suspension system includes, inter alia, springs 2a to 2d, elevation sensors 16 to 22, a central unit 10 and a compressor 12. The sensors 16 to 22 are assigned to corresponding ones of the air springs 2a to 2d. With the aid of such an air suspension system, the level of the vehicle body is controlled as described, for example, in U.S. patent application Ser. No. 10/240,824, filed Oct. 7, 2002(U.S.-2003-0051554-A1, published Mar. 20, 2003) and incorporated herein by reference.

The motor vehicle also has a tire pressure control arrangement with tire pressure sensors 26a to 26d assigned to corresponding ones of the tires, namely, the forward left tire, the forward right tire, the rearward left tire and the rearward right tire. With the tire pressure sensors 26a to 26d, the air pressures in the corresponding tires of the motor vehicle are measured and are transmitted to the central unit 28 of the tire pressure control arrangement. In the central unit 28, a check is made as to whether the air pressure, which is transmitted by the tire pressure sensors 26a to 26d, drops below a lower threshold value or exceeds an upper threshold value for the air pressure. In this case, a warning is outputted to the driver of the motor vehicle so that the driver can adapt the air pressure in the corresponding tire so that the air pressure lies between the threshold values. If required, the air pressure in the tire can also be automatically corrected in the manner described above when the tire pressure control arrangement includes the corresponding means.

The vehicle weight of the motor vehicle can be determined with the air suspension system as set forth in U.S. patent application Ser. No 10/240,824, filed Oct. 7, 2002 (U.S.-2003-0051554-A1, published Mar. 20, 2003). The laden state of the motor vehicle results from the difference between the instantaneous vehicle weight and the curb weight of the motor vehicle which is determined (in this way, the instantaneous laden state of the motor vehicle can be determined in equivalence from the instantaneous vehicle weight). The instantaneous laden state of the motor vehicle is computed in the central unit 10 of the air suspension system and is transmitted via the signal line 30 to the central unit 28 of the tire pressure control arrangement. Based on the transmitted instantaneous laden state, the upper and/or lower threshold value(s) are adapted in the tire pressure control arrangement. The adaptation can, for example, take place by means of a table stored in the central unit 28 wherein the threshold values, which correspond to different laden states of the motor vehicle, are stored. If there are no threshold values in the table for a specific laden state, then these threshold values can be computed in the central unit 28, for example, by linear regression from the next adjacent laden states and the threshold values corresponding thereto. This adaptation takes place preferably so that, for an increase of the laden state, the lower as well as the upper threshold values are adapted upwardly and, correspondingly, for a drop of the laden state, the two threshold values are adapted downwardly.

A renewed setting of the threshold values is undertaken each time the motor vehicle is taken into service in accordance with an embodiment of the invention. The central unit 10 of the air suspension system is therefore connected to the ignition switch 34 of the motor vehicle via a signal line 32. When the ignition switch 34 is actuated, a 1 is applied to the signal line 32, for example, and the laden state of the motor vehicle is determined in the central unit 10 and transmitted to the central unit 28. There, an adaptation of the threshold values is undertaken when a change in the laden state has taken place since the last time the motor vehicle was used.

If the ignition key is pulled out of the vehicle, then the ignition switch opens and a 0 is applied to the signal line 32. In a renewed actuation of the ignition switch, a 1 again lies on the signal line 32 so that the laden state is determined anew in the central unit 10. Alternatively, the ignition switch can also be connected to the central unit 20 of the tire pressure control arrangement.

According to a further embodiment of the invention, an adaptation of the threshold values takes place only when the instantaneous laden state deviates by a pregiven amount from the laden state for which the threshold values were last set. The pregiven amount can either be given absolutely or in percentages. If, for example, an amount of 50 kg is pregiven and, for example, the threshold values were last determined in the central unit 28 for a laden state of, for example, 200 kg, then a renewed setting of the threshold values takes place only when the laden state drops below 150 kg or exceeds 250 kg. The same applies when the amount is pregiven in percent.

If no new instantaneous laden state can be received in the central unit 28 after the last transmission of the instantaneous laden state from the central unit 10 to the central unit 28 after a pregiven time span, then, in the central unit 28 of the tire pressure control arrangement, the threshold values are determined based on an average laden state of the motor vehicle stored there. The monitoring of the time span takes place in the central unit 28.

In the central unit 28 of the tire pressure control arrangement, it is possible to set an upper and lower threshold value assigned to each individual tire of the motor vehicle. It is likewise possible to set a common lower and common upper threshold value of the tires which are assigned to the forward axles and to set a common other lower and upper threshold value for the tires of the rear axle (the setting can in this case also take place with the above-mentioned tables wherein a corresponding table is stored in the central unit 28 for each wheel or for each axle). In modern vehicles, use is often made of the above mostly for the tires of the front axle, lower threshold values are considered than for the tires of the rear axle of the motor vehicle. If different threshold values are set for the individual tires or for the tires of an axle, then the tire pressure sensors 26a to 26b transmit individual identifiers to the central unit 28 based upon which the central unit 28 can detect from which tire the instantaneous air pressure value had been transmitted.

It is understood that the foregoing description is that of the preferred embodiments of the invention and that various changes and modifications may be made thereto without departing from the spirit and scope of the invention as defined in the threshold value of the tires which are assigned to the forward appended claims.

What is claimed is:

1. A tire pressure control arrangement for a motor vehicle, the arrangement comprising:
   means for monitoring the air pressure in at least one pneumatic tire of said motor vehicle to obtain a measured pressure;
   means for comparing said measured pressure to a lower threshold value or to an upper threshold value;
   means for outputting a signal when the air pressure in said at least one pneumatic tire drops below said lower threshold value or exceeds said upper threshold value;
   an air suspension system including means for determining the laden state of said motor vehicle; and,
   means for automatically setting at least one of said threshold values in dependence upon said laden state of said motor vehicle so as to permit said signal outputting means to output a signal when the reset upper threshold value is exceeded or there is a drop below the reset lower threshold value.

2. The tire pressure control arrangement of claim 1, wherein a renewed setting of said threshold values takes place each time said motor vehicle is used.

3. The tire pressure control arrangement of claim 1, wherein a renewed setting of said threshold values is made only when the instantaneous laden state deviates by more than a pregiven amount from the laden state for which the threshold values were last set.

4. The tire pressure control arrangement of claim 1, further comprising
   means for controlling the air pressure in at least one of the tires of said motor vehicle; and,
   means for initiating the control of the air pressure when the air pressure drops below said lower threshold value or exceeds said upper threshold value.

5. A tire pressure control arrangement for a motor vehicle, the arrangement comprising:
   means for monitoring the air pressure in at least one pneumatic tire of said vehicle;
   means for outputting a signal when the air pressure in said at least one pneumatic tire drops below a lower threshold value or exceeds an upper threshold value;
   an air suspension system including means for determining the laden state of said motor vehicle;
   means for automatically resetting at least one of said threshold values in dependence upon said laden state of said motor vehicle so as to permit said signal outputting means to output a signal when the reset threshold value is exceeded or there is a drop therebelow;
   a first central unit incorporating said means for automatically setting said threshold values;
   said air suspension system including a second central unit incorporating said means for determining said laden state of said motor vehicle; and,
   said air suspension system further including means for transmitting the determined laden state to said first central unit wherein the threshold values are determined.

6. A tire pressure control arrangement for a motor vehicle, the arrangement comprising:
   means for monitoring the air pressure in at least one pneumatic tire of said motor vehicle;
   means for outputting a signal when the air pressure in said at least one pneumatic tire drops below a lower threshold value or exceeds an upper threshold value;
   an air suspension system including means for determining the laden state of said motor vehicle;
   means for automatically resetting at least one of said threshold values in dependence upon said laden state of said motor vehicle so as to permit said signal outputting means to output a signal when the reset threshold value is exceeded or there is a drop therebelow;
   wherein said lower and/or upper threshold values are set based on an average laden state of said motor vehicle when, after a predetermined time span, no instantaneous laden state is received by said tire pressure control arrangement.

7. A tire pressure control arrangement for a motor vehicle, the arrangement comprising:
   means of monitoring motor the air pressure in at least one pneumatic tire of said vehicle to obtain a measured pressure;
   an air suspension system including means for determining the laden state of said motor vehicle;
   means for establishing a lower threshold value and/or an upper threshold value corresponding to a different laden state of the motor vehicle;
   means for automatically resetting at least one of said threshold values in dependence upon said laden state of said motor vehicle;

means for comparing said measured pressure to at least one of the reset threshold values; and, means for outputting a signal when air pressure in said at least one pneumatic tire drops below said lower threshold value or exceeds said upper threshold value corresponding to said laden state of the vehicle.

8. The tire pressure control arrangement of claim 7, wherein said arrangement includes a control unit storing said upper and lower threshold values; and, said upper and lower threshold values function exclusively to permit a comparison of said measured pressure thereto.

9. The tire pressure control arrangement of claim 1, wherein said arrangement includes a control unit storing said upper and lower threshold values; and, said upper and lower threshold values function exclusively to permit a comparison of said measured pressure thereto.

* * * * *

UNITED STATES PATENT AND TRADEMARK OFFICE
CERTIFICATE OF CORRECTION

PATENT NO. : 6,941,989 B2
DATED : September 13, 2005
INVENTOR(S) : Joerg Grotendorst and Ludwig Dreilich It is certified that error appears in the above-identified patent and that said Letters Patent is hereby corrected as shown below:

Column 4,
Line 63, delete "20" and substitute -- 28 -- therefor.

Column 5,
Line 28, -- wherein, -- should be inserted before "mostly".
Line 42, "threshold value of the tires which are assigned to the forward" should be deleted.
Line 57, delete "setting" and substitute -- resetting -- therefor.

Column 6,
Line 14, -- motor -- should be inserted before "vehicle;".
Line 57, delete "of monitoring motor" and insert -- for monitoring -- therefor.
Line 58, -- motor -- should be inserted before "vehicle".

Signed and Sealed this

Twenty-second Day of November, 2005

JON W. DUDAS
*Director of the United States Patent and Trademark Office*